US006551566B1

(12) United States Patent
Grover et al.

(10) Patent No.: US 6,551,566 B1
(45) Date of Patent: Apr. 22, 2003

(54) HYDRODEHALOGENATION PROCESS USING A CATALYST CONTAINING NICKEL

(75) Inventors: Bhadra S. Grover, Sugar Land, TX (US); Henrik W. Rasmussen, Friendswood, TX (US)

(73) Assignees: Air Liquide Process and Construction, Inc., Houston, TX (US); Haldor Topeos Inc., Houston, TX (US)

(*) Notice: Subject to any disclaimer, the term of this patent is extended or adjusted under 35 U.S.C. 154(b) by 17 days.

(21) Appl. No.: 09/689,354

(22) Filed: Oct. 12, 2000

(51) Int. Cl.$^7$ ................................................. A62D 3/00
(52) U.S. Cl. ..................................................... 423/240 S
(58) Field of Search ........................ 423/240 S, 240 R, 423/648.1, 245.1

(56) References Cited

U.S. PATENT DOCUMENTS

| | | | |
|---|---|---|---|
| 3,925,490 A | * 12/1975 | Reich et al. ................ 252/373 |
| 4,039,623 A | 8/1977 | Lavanish et al. ........... 423/240 |
| 4,341,899 A | 7/1982 | Kremer et al. ............. 560/103 |
| 4,436,532 A | 3/1984 | Yamaguchi et al. ........ 48/209 |
| 4,968,502 A | * 11/1990 | Radel ......................... 423/224 |
| 5,019,135 A | 5/1991 | Sealock, Jr. et al. ...... 48/197 R |
| 5,021,383 A | 6/1991 | Berty ......................... 502/174 |
| 5,050,511 A | * 9/1991 | Hallett et al. ............... 110/215 |
| 5,114,692 A | 5/1992 | Berty ....................... 423/245.3 |
| 5,276,240 A | 1/1994 | Timmons et al. ........... 585/642 |
| 5,426,252 A | 6/1995 | Sherif ........................ 570/176 |
| 5,658,541 A | * 8/1997 | Matros et al. .............. 423/210 |

OTHER PUBLICATIONS

Topsoe, Henrik et al. *Hydrotreating Catalysis Science and Technology*, Springer–Verlag, Berlin Heidelberg, Germany, 310 pp., 1996 No Month.

Weiss, Alvin H. et al., "Hydrodechlorination and Oligomerization of Carbon Tetrachloride over Nickel Y Zeolites", *Journal of Catalysis*, 74:136–143; 1982 No Month.

Morato et al. "Conversion under hydrogen of dichlorodifluoromethane and chlorodifluoromethane over nickel catalysts" *Appl. Catalysis B: Environmental* 23: 175–185; 1999 No Month.

Tavoularis et al. "The gas phase hydrodechlorination of chlorobenzene over nickel/silica" *J Chem Technol Biotechnol* 74:60–70; 1999 No Month.

Cesteros et al. "Synthesis and characterization of several Ni/NiAl$_2$O catalysts active for the 1,2,4–trichlorobenzene hydrodechlorination" *Appl. Catalysis B: Environmental* 25:213–227; 2000 No Month.

Coute et al. "Steam reforming of chlorocarbons: chlorinated aromatics" *Appl. Catalysis B: Environmental* 26:217–226; 2000 No Month.

Van Der Ham et al. "Proposal for a regenerative high–temperature process for coal gas cleanup with calcined limeston" *Ind Eng Chem Res* 35:5:1487–1495; 1996 No Month.

Elvers et al. "Ullmann's Encyclopedia of Industrial Chemistry" p. 378; 1989 No Month.

* cited by examiner

*Primary Examiner*—Stanley S. Silverman
*Assistant Examiner*—Edward M. Johnson
(74) *Attorney, Agent, or Firm*—Kurt D. Van Tassel; Deborah G. VandenHoff; Van Tassel & Associates

(57) ABSTRACT

A gas stream containing at least about 90% (vol.) hydrogen and at least one halogen-containing compound is contacted with a nickel hydrogenation catalyst. When the gas stream contacts the hydrogenation catalyst substantially all halogen-containing compounds are dehalogenated.

26 Claims, 3 Drawing Sheets

HYDRODEHALOGENATION PROCESS USING A CATALYST CONTAINING NICKEL

TECHNICAL FIELD

This invention relates to hydrotreating processes and, in particular, to hydrodehalogenation processes and, more particularly, to hydrodehalogenation and deoxo processes.

BACKGROUND OF THE INVENTION

Catalytic processes are used to promote, as well as enhance, the efficiency of various industrial processes, such as synthesis, conversion and/or fluid treatment processes. But one common weakness that many of these catalytic processes suffer from is a near-zero tolerance of halogenated hydrocarbons (halohydrocarbons) or carbon oxides that may be present in a gaseous feedstock to some processes. Consequently, the presence of small amounts of halohydrocarbons or oxides can lead to substantially increased process operating costs by premature reduction in catalyst activity (i.e., catalyst poisoning). Catalyst poisoning reduces process efficacy and efficiency, as well as increases the catalyst systems' replacement frequency, which in turn, increase downtime and operating costs.

Some processes that have little to no tolerance to halohydrocarbons or oxides in the process feedstream include, without limitation, ammonia synthesis, hydrogenation (e.g., methyl acetylene and propadiene hydrogenation to propylene and propane), butadion (BDO) production, toluene diamine (TDA) production, hexamethyldiamine (HMDA) production, and hydrogen peroxide ($H_2O_2$) production. For example, halohydrocarbons often corrode equipment and/or poison catalysts, thereby reducing its catalytic activity. As another example, at low concentrations, sulfur, chlorine and halohydrocarbons can be poisons to catalysts used in the above-mentioned hydrogenation reaction and BDO, TDA, HMDA and $H_2O_2$ production. Also, sulfur, chlorine, halohydrocarbons and oxygen can be poisons at low concentrations to ammonia synthesis catalysts.

Accordingly, there has been a continuing effort to reduce or eliminate halohydrocarbons, present in various chemical process feedstocks, by converting halohydrocarbons to compounds that can be removed by conventional means or that do not have a deleterious effect on the catalysts.

Also, certain halogenated hydrocarbons, often called halohydrocarbons, have wide-ranging applications including use in adhesives, aerosols, various solvents, pharmaceuticals, dry cleaning textile processing and as reaction media. However, many halohydrocarbons, particularly fluorohydrocarbons and chlorohydrocarbons, can be toxic to human health and the environment at relatively low concentrations. In view of this potential toxicity, the use and environmentally acceptable emissions of many halohydrocarbons is becoming more stringently regulated in Europe, the United States, Canada and many other industrially developed communities. Accordingly, there have also been efforts to reduce or eliminate the halohydrocarbons by catalytically converting halohydrocarbons to less toxic or nontoxic compounds that have a reduced risk to health and the environment.

For example, in U.S. Pat. No. 4,039,623, Lavanish et al. disclose a hydrated nickel (Ni) oxide catalyst for lowering the $C_2$ to $C_4$ halohydrocarbon content in an oxygen-containing gaseous stream, such as an air stream. Lavanish et al. require that their hydrodehalogenation process be conducted at a temperature in the range from 20° to 500° C. and with a stoichiometric amount of oxygen ($O_2$) sufficient for converting the carbon content to carbon dioxide. As well, hydrated nickel oxides having Ni in a +2, +3 or +4 oxidation state must be used for catalyzing the Lavanish hydrodehalogenation reaction.

Also, U.S. Pat. No. 5,021,383 and U.S. Pat. No. 5,114,692, both by Berty, disclose catalytically converting halohydrocarbons to nontoxic products using a catalyst composition having both a metal based catalyst and an alkali or alkali-earth carbonate, preferably with the catalyst dispersed in the carbonate. Berty discloses metal catalysts comprising a metal such as manganese, copper, silver, iron or aluminum or a metal oxide, such as nickel oxides, cobalt oxide, aluminum oxide, vanadium oxide, tungsten oxide, molybdenum oxide or mixtures thereof. The carbonate is required in Berty's catalyst composition to react with hydrochloric acid (HCl) formed during the catalytic conversion process to prevent reformation of new halohydrocarbons. According to Berty, a carbonate, such as $CaCO_3$, will react with HCl immediately, thereby preventing gaseous HCl from vaporizing and reoxidizing back to chlorine gas ($Cl_2$), which can subsequently chlorinate another organic compound in the reaction feedstock. Thus, Berty believes a metal catalyst/carbonate composition is important to effectively hydrodehalogenating a feedstock.

As reported in the *Journal of Catalysis*, 74, 136–134 (1982), Weiss et al. studied hydrodechlorination and oligomerization of carbon tetrachloride ($CCl_4$) using a nickel-based sodium Y zeolite (NiNaY) catalyst composition pre-reduced in a hydrogen ($H_2$) atmosphere at 370° or 530° C. The reduced NiNaY catalyst was subsequently used to catalyze the reaction between $H_2$ and $CCl_4$ at 370° C. Weiss et al. observed that NiNaY catalyzed reaction of $H_2$ and $CCl_4$ produced small amounts of methane ($CH_4$), ethane ($C_2H_6$), propane ($C_3H_8$) and butane ($C_4H_{10}$). To their surprise, however, they found that the NiNaY catalyst, most particularly a mixed nickel/cobalt (NiCo) Na Y zeolite, was most active and selective for producing predominantly 1,1,1,2-tetrachloroethane ($Cl_3CCH_2Cl$) per mole of $CCl_4$ (i.e., 0.4 mole of $Cl_3CCH_2Cl$ per mole of $CCl_4$ at 80–100% conversion). And at lower $CCl_4$ conversions chloroform ($CHCl_3$) and hexachloroethane ($C_2Cl_6$) were also primary reaction products as well as $Cl_3CCH_2Cl$.

Weiss et al. concluded further, from X-ray photoelectron diffraction measurements, that "in the case of the nickel-exchanged NaY catalyst, it is the nickel metal that is clearly the catalytic agent, the amount of $Ni^0$ being a function of reduction temperature." Also, they hypothesized that "the zeolite environment is central to the tailoring of the reaction system [and] [n]ickel that has migrated out of the supercage behaves differently than $Ni^0$ inside the supercage."Accordingly, Weiss et al. provided evidence that a $Ni^0$ supported on a NaY zeolite can contribute to a hydrodehalogenation reaction, but with $Cl_3CCH_2Cl$, $CHCl_3$ and $C_2Cl_6$ being the primary reaction products, among other halohydrocarbons. Moreover, Weiss et al. showed that NiNaY catalyst could produce only minor amounts of fully hydrogenated products, such as $CH_4$, $C_2H_6$, $C_3H_8$ and $C_4H_{10}$, while predominantly producing halohydrocarbon products.

In U.S. Pat. No. 4,436,532, Yamaguchi et al. disclosed using a nickel-based, nickel/molybdenum-based (Ni/Mo) or cobalt/molybdenum-based (Co/Mo) catalyst in sulfided form to hydrodehalogenate gaseous feedstock, called pyrolysis gas, produced from pyrolyzing solid wastes at 550° C. or greater. The pyrolysis gas is composed primarily of $H_2$, carbon monoxide (CO), carbon dioxide ($CO_2$), $CH_4$, $C_2$ and higher hydrocarbons, as well as smaller amounts of HCl, methyl chloride ($CH_3Cl$) (i.e., about 1,000–1,500 ppm), ammonia ($NH_3$), hydrogen sulfide ($H_2S$), 100–1000 ppm of organosulfuric compounds, hydrogen cyanide (HCN) and trace amounts of other chlorohydrocarbons. Yamaguchi et al. observed that a non-sulfided hydrogenating catalyst would drive the methanation reaction (i.e., converting CO and $CO_2$ into $CH_4$). They also observed that this methanation reaction was undesired because it would produce "troubles," such as excessive temperature excursions due to high concentrations of CO and $CO_2$, for the hydrodesulfurization (HDS) and hydrodehalogenation (HDH) reactions important to reducing the overall toxicity of the product stream. Accordingly, Yamaguchi et al. stressed the importance of using a Ni-, Ni/Mo- or Co/Mo-based catalyst in sulfided form to-concurrently promote both the HDS and HDH reactions, while at the same time suppressing the undesired methanation reaction (see col. 6, lines 62–68 of U.S. Pat. No. 4,436,532).

In U.S. Pat. No. 5,019,135, Sealock, Jr. et al. disclosed a biomass conversion process using a reduced Ni/alkali catalyst composition to convert mixtures of water and plant tissue containing lignin and at least 1 wt. % cellulose (i.e., lignocellulosic materials, such as sorghum, sunflower, potato waste, etc.) into a fuel gas composed primarily of $CH_4$, $H_2$ and $CO_2$. This biomass conversion process is conducted in the temperature range of 300° to 450° C. and under a pressure of at least 100 atmospheres (i.e., 10 MPa or 1470 psi), to prevent water from boiling over in the reactor. Sealock, Jr. et al. determined that the alkali catalyst, selected from the group consisting of sodium, potassium or cesium ion, can be in the form of a carbonate, oxide or salt. And despite experimental results indicating that there is an inverse relationship between $CH_4$ produced and the alkali carbonate concentration, they specified that at least 0.0001 mole of elemental alkali metal per gram of dry lignocellulosic material was required to produce an alkali/Ni co-catalyst system that could promote the biomass conversion process (see col. 10, lines 3–15 of U.S. Pat. No. 5,019,135). Also, there was no suggestion or experimental evidence that this co-catalyst system would facilitate hydrodehalogenation of halohydrocarbons.

As discussed above, Yamaguchi et al. observed, what is well understood by those skilled in art: a sulfided catalyst composition is required for catalytic performance in hydrodesulfurization (HDS) and hydrogenation (HYD) reactions, while a non-sulfided catalyst composition is required for catalytic performance in a methanation reaction (i.e., converting CO and/or $CO_2$ into $CH_4$). Also, in an exhaustive review and technical analysis of the literature on hydrotreating catalysis, compiled in *Hydrotreating Catalysis* by H. Topsoe, B. S. Clausen, F. E. Massoth, (1996, vol. 11, *Catalysis, Science and Technology* series), Topsoe et al. indicate it has been known for a long time that many transition metal sulfides are active catalysts in hydrotreating (see p. 208). Hydrotreating refers to a variety of catalytic processes which add H to unsaturated hydrocarbons while removing heteroatoms, such as S, N, O and metals to form saturated hydrocarbons with no heteroatoms. Accordingly, since CO and $CO_2$ are not hydrocarbons, converting CO and $CO_2$ to $CH_4$ (i.e., methanation) is not typically viewed as hydrotreating type process. Thus, those skilled in the art of hydrotreating have typically used conventional sulfided catalyst compositions for (HYD) and, likewise, for hydrodehalogenation (HDH) processes.

However, it is difficult to maintain a sulfided catalyst in the presence of $H_2$ and a low concentration of S-containing compounds (for example, 1–2 ppm (vol.)). Specifically, under these conditions, sulfur is stripped from the catalyst, releasing $H_2S$, and metal is reduced to a free metal state. The catalyst thus becomes a hydrocracking catalyst, thereby promoting undesirable side reactions. Also, if a sulfided catalyst is used, a separate methanation catalyst reaction step is required, thereby making the process a two-step, rather than a one-step, process. Also, ultimate disposal of sulfur containing catalyst compositions can present additional environmental and safety issues often not encountered with non-sulfided catalyst systems. Moreover, two component catalyst systems, like those disclosed by Berty and Sealock, Jr. et al., requiring an additional non-metal component can be cumbersome to manufacture and/or use with consistent performance results. Also, the high pressure required to promote some conversion processes, such as Sealock, Jr. et al.'s biomass conversion process, increases the operating costs and introduces a potential safety risk that must be managed.

Accordingly, there is a need for a non-sulfided catalyst system that can dehalogenate substantially all halohydrocarbons in a gaseous feedstock to saturated hydrocarbons, preferably without the requirement for an additional process step and, more preferably at pressures below 10 MPa (1470 psi).

SUMMARY OF THE INVENTION

According to the invention, there is provided a process for treating a gas stream having at least about 90 volume percent of $H_2$, based on the total volume of all constituents comprising said gas stream, at least one halogen-containing compound and a total concentration of S-containing compounds less than about 2 ppm by volume, based on a mono-sulfur compound equivalent, said method comprising:

(a) contacting said gas stream with a nickel catalyst composition, wherein said halogen-containing compound contacts said nickel catalyst composition so that a substantial portion of said halogen-containing compound is reduced, said catalyst composition comprising a source for nickel in a zero oxidation state, $Ni^0$, selected from the group consisting of
  (i) at least about 5 weight percent $Ni^0$,
  (ii) a $Ni^0$ precursor having $Ni^{+n}$, where $1 \leq n \leq 4$, that can produce at least about 5 weight percent $Ni^0$ under substantially reducing conditions, and
  (iii) combinations thereof,
    said $Ni^0$ weight percent being measured as a percentage of the total weight of all constituents comprising said nickel catalyst composition; and
(b) producing a nickel catalyst-treated gas stream, wherein substantially all halogen-containing compounds are de-halogenated.

BRIEF DESCRIPTION OF THE DRAWINGS

The hydrodehalogenation process of the present invention will be better understood by referring to the following detailed description of preferred embodiments and the drawings referenced therein, in which.

DETAILED DESCRIPTION OF THE PREFERRED EMBODIMENTS

Figure 1:
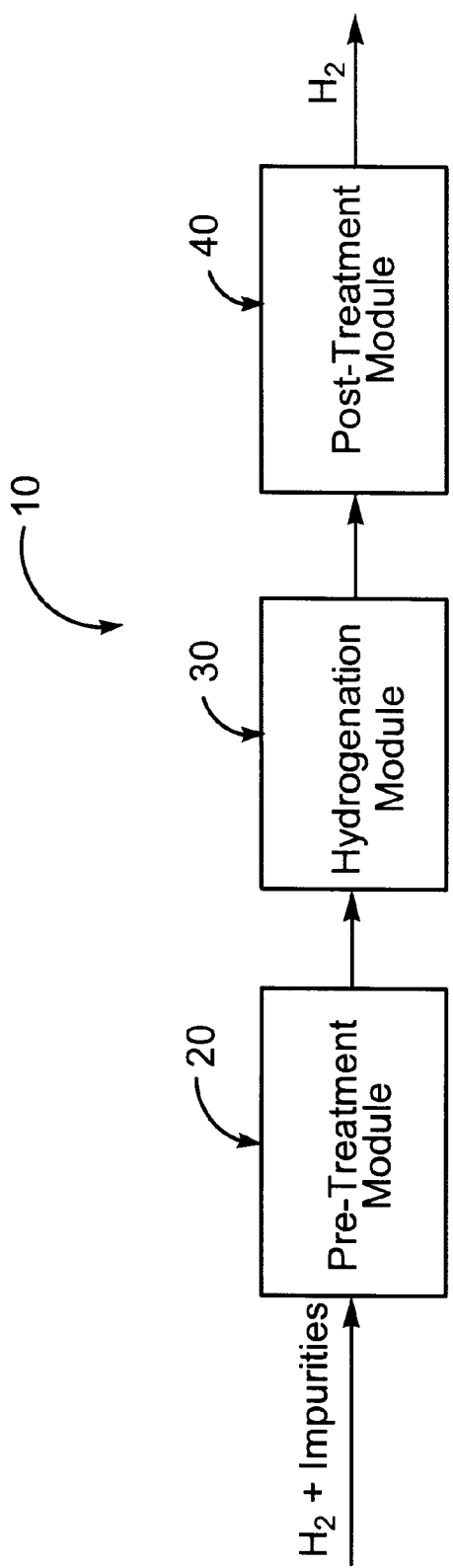
FIG. 1 is a schematic drawing of general components of a preferred embodiment of the process.

In accordance with the process of the present invention, a gas stream containing at least about 90% (vol.) hydrogen (H$_2$) and at least one halogen-containing compound is contacted with a nickel (Ni) hydrogenation (HYD) catalyst. When the gas stream contacts the HYD catalyst, halogen-containing compounds are de-halogenated.

By "halogen-containing compound", we mean any hydrocarbon having one or more halogen substituents selected from the group consisting of fluorine (F), chlorine (Cl), bromine (Br), iodine (I), and combinations thereof. Halogen-containing compounds have the general formula RX$_n$, wherein each X is independently a halogen, R is a C$_1$ to C$_3$ saturated hydrocarbon, and n=1 to 4.

By "de-halogenated", we mean a compound having no halogen substituents. It will be understood, however, from the detailed description and accompanying drawings that a by-product of de-halogenation is the corresponding hydro-halide acid (e.g., HCl).

Advantageously, any O$_2$ and O$_2$-containing compounds present in the gas stream can also be reacted in the same process step.

Referring now to the drawings, a process according to the present invention has a HYD module 30. Preferably, the feedstock gas stream is pre-treated in a pre-treatment module 20. Also, it may be desirable to treat gas exiting the HYD module 30 in a post-treatment module 40.

Feedstock Composition

The feed gas to the HYD module 30 has at least about 90% (vol.) hydrogen (H$_2$), at least one halogen-containing compound, and a total concentration of less than about 2 ppm (vol.) mono-sulfur-containing compounds, i.e., based on the sulfur-containing compound having one sulfur atom per compound ("mono-sulfur compound concentration"). For example, because dimethyldisulfide ("DMDS") has two sulfur atoms per DMDS molecule, the maximum allowable DMDS concentration in the feedstock, equivalent to the maximum mono-sulfur compound concentration of about 2 ppm (vol.), would be about 1 ppm (vol.). In other words, about 1 ppm (vol.) would be the maximum allowable di-sulfur compound concentration. Accordingly, the maximum allowable sulfur compound concentration can be determined by dividing maximum mono-sulfur compound concentration of about 2 ppm (vol.) by the number of sulfur atoms per compound. However, for convenience of discussion below, the concentrations referenced for sulfur-containing compounds will be based on a mono-sulfur compound equivalent.

Preferably, the concentration of H$_2$ in the gas stream is at least about 95% (vol.). The gas stream may also contain oxygen (O$_2$) and/or oxygen-containing compounds, such as, for example, without limitation, CO, CO$_2$, N$_2$O, NO, NO$_2$, HNO$_3$ and combinations thereof. Any carbon-containing compounds in the feedstock are preferably C$_1$–C$_3$ saturated compounds. At greater than C$_3$, there is a potential coking problem in the HYD module 30.

The gas stream may further contain amines, such as, for example, without limitation, R$_1$NH$_2$, R$_1$R$_2$NH, R$_1$R$_2$R$_3$N, and combinations thereof, where R$_1$, R$_2$ and R$_3$ are independently selected from the group consisting of C$_1$ to C$_3$ hydrocarbyl groups.

When O$_2$ is present in the gas stream, the mole ratio of H$_2$ to O$_2$ is preferably at least about 10:1. More preferably, the mole ratio of H$_2$ to O$_2$ in the gas stream is in a range of from about 10:1 to about 100,000:1. The H$_2$ concentration should be in excess of that stoichiometrically required for the chemical reactions in order to suppress reaction of Ni in the catalyst to NiO, resulting in reversible deactivation of the catalyst.

Advantageously, a portion of the gas exiting the HYD module 30 is recycled to the inlet of the HYD module 30 to increase the H$_2$ concentration in the feedstock.

As mentioned above, the gas feed to the HYD module 30 has less than about 2 ppm (vol.) S-containing compounds, based on a mono-sulfur compound equivalent. More preferably, the total concentration of S-containing compounds in the feedstock entering the HYD module 30 is less than about 0.2 ppm (vol.), based on a mono-sulfur compound equivalent. Most preferably, the total concentration of S-containing compounds in the feedstock entering the HYD module 30 is less than about 10 ppb (vol.), based on a mono-sulfur compound equivalent.

If the feedstock contains a higher concentration of S, the feedstock is preferably treated in pre-treatment module 30 to remove S to less than about 2 ppm (vol.), based on a mono-sulfur compound equivalent.

Suitable gaseous feedstocks for treatment in the process of the present invention include, without limitation, by-product gaseous streams from chlorine electrolytic cells, waste incineration, pyrolysis gases, and by-product gaseous streams from HF alkylation processes.

In one particular application, a H$_2$ waste stream from a process for producing chlorine by electrolytic cells is converted into a useful product. A typical composition of the waste H$_2$ gas stream from chlorine cell production is listed in Table 1.

TABLE 1

| Component | Concentration (vol.) |
|---|---|
| H$_2$ | 98.8–99.7% |
| O$_2$ | 0.1–0.7% |
| N$_2$ | 0.05–0.5% |
| CO | 1–10 ppmv |
| CO$_2$ | 2–55 ppmv |
| RCl | 1–5 ppmv |
| HCl | 2–7 ppmv |
| H$_2$O | saturated at 90° F.–120° F. |

Examples of chlorohydrocarbons (RCl) in such a waste hydrogen gas stream are listed in Table 2.

TABLE 2

| Chlorohydrocarbons | ppm (vol.) |
|---|---|
| Chloroform | 1.0–5.0 |
| Carbon tetrachloride | 0.1–1.0 |
| Methylene Chloride | 0.2–2.0 |
| 1-2 Dichloroethane | 0.1–1.0 |
| 1,1,2 Trichloroethane | 0.1–0.5 |
| Methyl Chloroform | 0.01–0.07 |
| Vinyl Chloride | 0.1–1.0 |
| Bromochloromethane | 0.01–0.08 |
| Bromodichloromethane | 0.01–0.02 |

In order to maximize potential for subsequent H$_2$ gas applications, the gas should be treated to the specifications listed in Table 3.

TABLE 3

| Component | Concentration (vol.) |
|---|---|
| H$_2$ | Balance |
| O$_2$ | <1 ppm |
| CO | <1 ppm |
| CO$_2$ | <1 ppm |
| RCl | <1 ppm Some applications may require <50 ppb |
| HCl | <0.1 ppm |

Typically, the presence of N$_2$ and/or methane (CH$_4$) is not a problem.

Hydrogenation Module

The HYD module 30 may be in any suitable configuration such as, for example, without limitation, a fixed bed, a fluidized bed, a moving bed, radial flow bed, isothermal tubular reactor, and combinations thereof.

HYD Catalyst

When the gas stream is contacted with the HYD catalyst, halogenated compounds react with $H_2$ to produce $R(H)_n$ and a hydrohalide acid.

The HYD catalyst also catalyzes the reaction of $H_2$ with $O_2$ and oxygen-containing compounds, such as, for example, without limitation, CO, $CO_2$, $N_2O$, NO, $NO_2$, $HNO_3$ and combinations thereof, to produce $CH_4$, water, and/or $NH_3$.

$H_2$ also reacts with amines, such as, for example, without limitation, $R_1NH_2$, $R_1R_2NH$, $R_1R_2R_3N$, and combinations thereof, in the presence of the HYD catalyst to produce $NH_3$.

$H_2$ also reacts with $N_2$ to produce $NH_3$.

Figure 2:
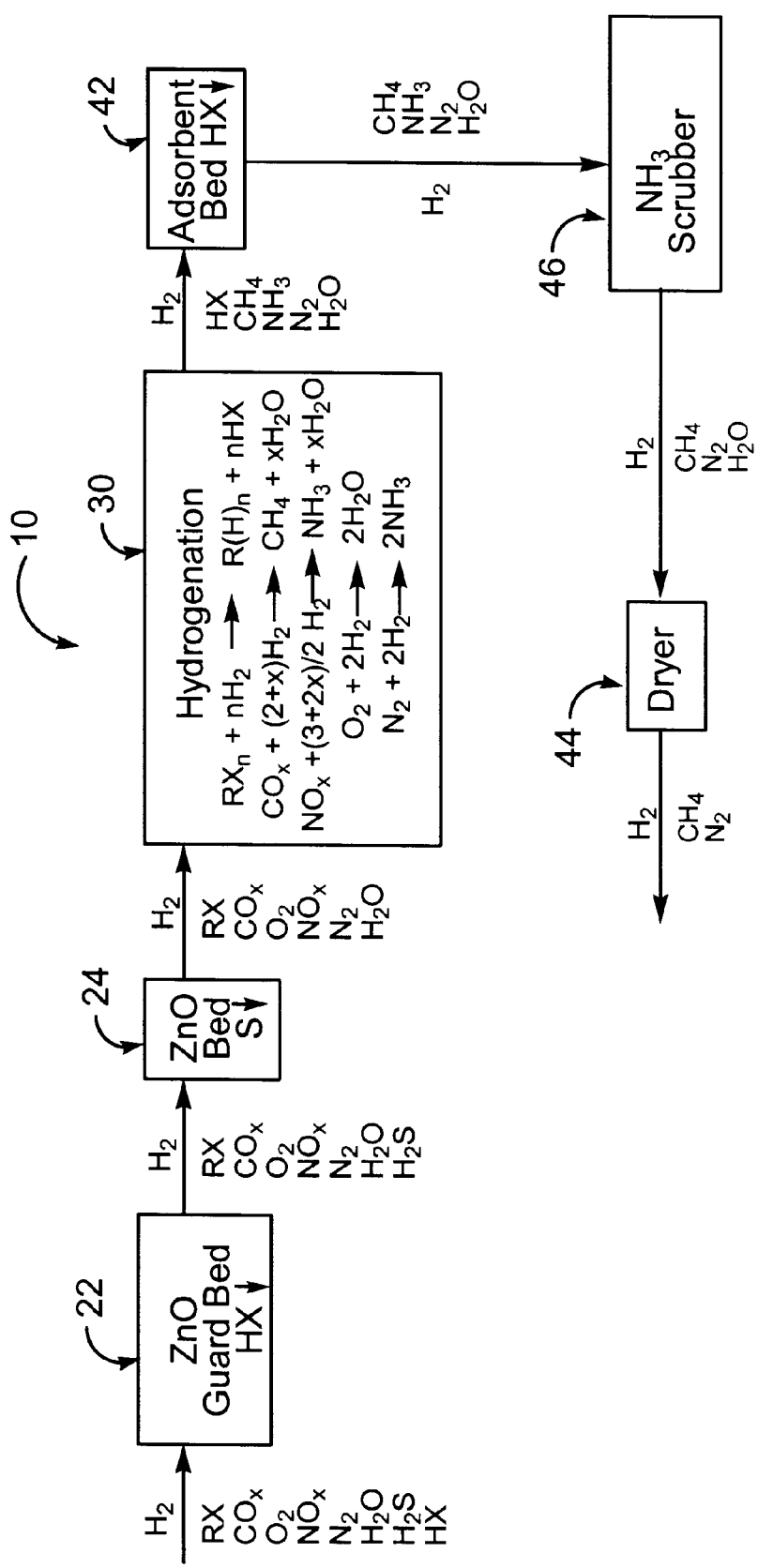
FIG. 2 is a more detailed schematic drawing of a preferred embodiment of the process.

The reactions catalyzed by the HYD catalyst are summarized in the HYD module in FIG. 2.

The catalyst used in the HYD module 30 is a nickel (Ni) catalyst composition. The catalyst composition is a source for Ni in a zero oxidation state, $Ni^0$. The catalyst composition has at least about 5% (wt.) $Ni^0$. However, the $Ni^0$ source may also be produced in situ in the HYD module from a $Ni^0$ precursor having $Ni^{+n}$, where $1 \leq n \leq 4$, that can produce at least about 5% (wt.) $Ni^0$ under substantially reducing conditions.

By "substantially reducing conditions", we mean an $H_2/O_2$ ratio of at least about 5:1 or the functional equivalent thereof.

Preferably, the $Ni^0$ or $Ni^0$ precursor concentration is in a range of from about 5 to about 65% (wt.). More preferably, the $Ni^0$ or $Ni^0$ precursor concentration is in a range of from about 10 to about 50% (wt.). Most preferably, the $Ni^0$ or $Ni^0$ precursor concentration is in a range of from about 15 to about 25% (wt.).

The catalyst composition may also include a catalyst promoter, such as, for example, without limitation, molybdenum (Mo), tungsten (W), chromium (Cr), cobalt (Co), platinum (Pt), palladium (Pd) and combinations thereof. Preferably, when using a catalyst promoter, the promoter concentration is in a range of from about 0.05% to about 5% (wt.).

The catalyst may be supported or unsupported. Preferably, the catalyst is supported. A suitable support material is inert with respect to the desired hydrodehalogenation reaction(s), as well as any undesired halo-compound by-product reaction(s). Examples of suitable supports include, without limitation, aluminum oxide, magnesium oxide, calcium oxide and combinations thereof. By contrast, the NaY zeolites, such as those used by Weiss et al. (discussed above), would be unsuitable. For example, those zeolite catalyst supports promote various halogenation and halo-compound oligomerization reactions that would significantly impede the catalyst's activity towards the desired hydrodehalogenation reaction.

Preferably, the support concentration in the catalyst composition is in a range of from about 35% to about 95% (wt.). More preferably, the support concentration is in a range of from about 60% to about 80% (wt.).

Other factors affecting the HYD catalyst performance are the catalyst size and the catalyst surface area. Preferably, the catalyst surface area is in a range of from about 100 $m^2/g$ ($4.9 \times 10^5$ $ft^2/lb$) to about 300 $m^2/g$ ($14.6 \times 10^5$ $ft^2/lb$) More preferably, the catalyst surface area is in a range of from about 200 $m^2/g$ ($9.8 \times 10^5$ $ft^2/lb$) to about 300 $m^2/g$ ($14.6 \times 10^5$ $ft^2/lb$).

HYD Operating Conditions

Preferably, the gas stream is contacted with the catalyst composition at a temperature greater than about 475° F. (246° C.). More preferably, the gas stream is contacted with the catalyst composition at a temperature in a range of from about 500° F. (260° C.) to about 1200° F. (649° C.). Most preferably, the gas stream is contacted with the catalyst composition at a temperature in a range of from about 600° F. (316° C.) to about 850° F. (454° C.). At temperatures below 475° F. (246° C.), NiCl may form and the HYD catalyst would be deactivated. While catalyst sintering can occur at temperatures less than about 1000° F. (538° C.), permanent catalyst activity loss may become excessive at temperatures greater than 1200° F. (649° C.).

Because the HYD catalyst slowly deactivates during the course of a run, the HYD module 30 operating temperature is preferably increased during the run to maintain a constant product quality. For example, the presence of halogenated hydrocarbons may be monitored in the gas stream exiting the HYD module 30. When the halogenated hydrocarbon concentration reaches a predetermined threshold, the HYD module temperature may be increased to increase the catalyst activity, thereby decreasing the halogenated hydrocarbon concentration in the product.

Under substantially reducing conditions, any Ni oxides that may have been present in the HYD catalyst charge are converted to $Ni^0$, nickel in a zero oxidation state. Also, at the HYD module 30 operating temperature, no nickel oxides are produced because the temperature is too high (i.e., greater than about 212° F. (100° C.).

The HYD module 30 is preferably operated at a pressure in a range of from about 5 psig (35 kPa) to about 1000 psig ($6.9 \times 10^3$ kPa). More preferably, the pressure is in a range of from about 50 psig (350 kPa) to about 1000 psig ($6.9 \times 10^3$ kPa). Most preferably, the pressure is in a range of from about 100 psig (690 kPa) to about 900 psig ($6.2 \times 10^3$ kPa).

Because high $H_2$ partial pressures suppress the formation of carbonaceous catalyst deposits, longer processing runs can be achieved when higher pressures are used. However, it will be appreciated by those skilled in the art that there is a point at which further pressure increases are not economically viable.

The space velocity in the HYD module 30 is preferably in a range of from about 500 to about 8000 $SCFH/ft^3$ catalyst (SCFH=standard cubic feet/hr) or $Nm^3/hr/m^3$ catalyst ($Nm^3$=normal cubic meter). More preferably, the space velocity is in a range of from about 2000 to about 5000 $SCFH/ft^3$ (or $Nm^3/hr/m^3$) catalyst. Most preferably, the space velocity is in a range of from about 3000 to about 4000 $SCFH/ft^3$ (or $Nm^3/hr/m^3$) catalyst.

It will be apparent to one skilled in the art that the total volume of the $Ni^0$ or $Ni^0$ precursor catalyst required so that substantially all halogen-containing compounds are de-halogenated will be substantially inversely proportional to the $Ni^0$ or $Ni^0$ precursor concentration in the catalyst. For example, with all other operating conditions being the same, at lower concentrations, a higher total volume of catalyst would be required to obtain a substantially similar conversion efficiency with a lower total volume of a higher concentration catalyst.

The space velocity and temperature can be changed in view of the concentration and type of impurities in the feedstock. Generally, as space velocity is decreased, other factors being constant, reactions will approach equilibrium if, of course, they have not already reached completion or chemical equilibrium. Also, generally as temperature is increased, other factors being constant, the rate of all reactions will increase. Temperature also affects equilibrium. For example, for exothermic reactions such as hydrogenation and methanation, lower temperatures favor equilibrium, so that the net effect of a temperature increase is the sum of two opposing effects. The space velocity and temperature can therefore be changed independently or simultaneously to increase the extent of catalytic reactions in the HYD module.

Pre-Treatment Module

Preferably, the gas stream is treated in a pre-treatment module 20 in order to protect the HYD catalyst from catalyst poisons.

By "poison", we mean a substance that causes catalyst decay or adversely affects the performance of a desired catalytic reaction by (1) parallel deactivation, (2) series deactivation and/or (3) side-by-side deactivation. By "parallel deactivation", we mean a side product deposits on and deactivates a catalyst surface. By "series deactivation", we mean a reaction product decomposes or reacts further to produce material, which then deposits on and deactivates a catalyst surface. By "side-by-side deactivation", we mean an impurity in feed deposits on and deactivates the catalyst surface. Such deactivation may be reversible or irreversible.

For example, gas stream components that can adversely affect the performance of the HYD catalyst are sulfur (S) containing compounds, including $H_2S$. Preferably, the total concentration of any S-containing compounds in the feedstock to the HYD module 30 is reduced to less than about 2 ppm (vol.), based on a mono-sulfur compound equivalent, in a pre-treatment module 20. More preferably, the gas stream contacting the HYD catalyst has a total concentration of less than about 0.2 ppm (vol.), based on a mono-sulfur compound equivalent. Most preferably, the gas stream contacting the HYD catalyst has a total sulfur concentration of less than about 10 ppb (vol.), based on a mono-sulfur compound equivalent.

In one embodiment, there are two HYD catalyst beds, operating in series (not shown). The first lead bed is a sacrificial bed to "capture" any HYD catalyst poisons. The feedstock to the lead sacrificial bed may contain a higher S concentration than stated above. When catalyst poisons are detected in the second lag bed, the lead bed is removed, the lag bed becomes the lead bed and a new or reactivated lag bed is installed.

In another embodiment, the feedstock is passed through a poison adsorbent guard bed 24 prior to contacting the HYD catalyst, with or without a sacrificial HYD catalyst bed. This embodiment may be more economical than using a sacrificial HYD bed alone.

Suitable adsorbents for S-adsorbent guard beds are known to those skilled in the art and may include, for example, without limitation, zinc oxide (ZnO), iron oxide, copper-based absorbent, nickel-based absorbent, activated carbon and combinations thereof. Preferably, the S-adsorbent guard bed is ZnO.

It will be understood that operating conditions may be different for different types of guard beds. However, the S-guard bed 24 is preferably operated at a temperature in a range of from about 100° F. (38° C.) to about 700° F. (371° C.). More preferably, the S-guard bed is operated at a temperature in a range of from about 400° F. (204° C.) to about 700° F. (371° C.). Most preferably, the S-guard bed is operated at a temperature in a range of from about 600° F. (316° C.) to about 700° F. (371° C.).

The S-guard bed 24 is preferably operated at a pressure in a range of from about 150 psig (1000 kPa) to about 700 psig (4800 kPa). More preferably, the pressure is in a range of from about 200 psig (1400 kPa) to about 600 psig (4100 kPa).

The space velocity in the S-guard bed 24 is preferably in a range of from about 500 to about 10,000 $SCFH/ft^3$ (or $Nm^3/hr/m^3$) adsorbent. More preferably, the space velocity is in a range of from 3000 about to about 8000 $SCFH/ft^3$ catalyst/$ft^3$ (or $Nm^3/hr/m^3$) adsorbent.

If a ZnO guard bed is used, it is preferable to pre-treat the feedstock to remove at least a portion of ZnO poisons present in the gas stream. Examples of such ZnO poisons include, for example, without limitation, HCl, HF, HBr, Hl and combinations thereof.

ZnO poisons may be removed, for example, without limitation, by an alumina bed 22, a calcium oxide bed, or a chemical neutralizing bed, such as, without limitation, an alkaline solution. The alumina may be impregnated, for example, without limitation, with Na, K, Ba and combinations thereof.

Preferably, the ZnO-guard bed 22 is operated at a temperature in a range of from about ambient temperature to about 700° F. (371° C.). More preferably, the guard bed is operated at a temperature in a range of from about 85° F. (29° C.) to about 400° F. (204° C.).

The ZnO-guard bed 22 is preferably operated at a pressure in a range of from about 50 psig (345 kPa) to about 700 psig (4800 kPa). More preferably, the pressure is in a range of from about 200 psig (1400 kPa) to about 600 psig (4100 kPa).

The space velocity in the ZnO-guard bed 22 is preferably in a range of from about 500 to about 10,000 $SCFH/ft^3$ (or $Nm^3/hr/m^3$) adsorbent. More preferably, the space velocity is in a range of from about 3000 to about 8000 $SCFH/ft^3$ (or $Nm^3/hr/m^3$) adsorbent.

FIG. 2 illustrates an embodiment where ZnO is used to adsorb S-containing compounds from the feedstock and a ZnO poison guard bed 22 is used to protect the ZnO bed 24.

Post-treatment Module

Preferably, the gas stream exiting the HYD module 30 is treated to remove by-products of the catalyzed reactions. For example, hydrohalide acid produced in the reaction may be removed by a chemical neutralizing bed, such as, without limitation, an alkaline solution, and/or an adsorbent bed 42. An example of a suitable adsorbent bed is, without limitation, an alumina bed or a calcium oxide bed. The alumina may be impregnated with Na, K, Ba and combinations thereof.

Preferably, the adsorbent bed 42 is operated at a temperature in a range of from about ambient temperature to about 700° F. (371° C.). More preferably, the adsorbent bed 42 is operated at a range of from about 85° F. (29° C.) to about 400° F. (204° C.)

The adsorbent bed 42 is preferably operated at a pressure in a range of from about 50 psig (345 kPa) to about 700 psig (4800 kPa). More preferably, the pressure is in a range of from about 200 psig (1400 kPa) to about 600 psig (4100 kPa).

The space velocity in the adsorbent bed 42 is preferably in a range of from about 500 to about 10000 $SCFH/ft^3$ (or $Nm^3/hr/m^3$) adsorbent. More preferably, the space velocity is in a range of from about 3000 to about 8000 $SCFH/ft^3$ (or $Nm^3/hr/m^3$) adsorbent.

As demonstrated by the catalyzed reaction schemes illustrated in FIG. 2, water is also a by-product that often is desirably removed from the $H_2$ gas stream. Water may be removed, as illustrated in FIG. 2 by a means for drying the gas stream in dryer 44. Means for drying a gas stream are known to those skilled in the art. One example of a means for drying may include, without limitation, molecular sieves.

As mentioned above, but not illustrated in FIG. 2, another possible by-product of the catalyzed HYD reaction is $NH_3$, which can be removed in an $NH_3$ scrubbyer 46. An example of a suitable $NH_3$ scrubber is, without limitation, a packed or trayed column with counter-current wash with water or an acid, to neutralize $NH_3$ to a salt for disposal.

EXAMPLES

The following non-limiting examples of embodiments of the present invention that may be made and used as claimed herein are provided for illustrative purposes only.

The catalyst used in the following examples was a supported nickel catalyst with a composition of 25% (wt.) Ni, ≦0.1% (wt.) NiO and 60–70% (wt.) alumina is commercially available from Haldor Topsoe A/S, under the trademark HCL-10.

Example 1

A gaseous $H_2$ stream was passed at ambient pressure and different flow velocities through a flask with chloroform ($CHCl_3$) at a temperature ranging from 30° F. (−1° C.) to −58° F. (−50° C.) to produce a $CHCl_3$-enriched $H_2$ stream having 1,500 to 80,000 ppm $CHCl_3$. Higher temperatures resulted in a higher $CHCl_3$ content. The $CHCl_3$-enriched $H_2$ stream was subsequently introduced into a reaction vessel with a fixed catalyst bed. The reaction vessel was maintained at 572° F. (300° C.). The effluent from the catalyst bed was washed with a solution of sodium carbonate to remove formed HCl.

The chloroform concentration in the $H_2$ gas was measured by Gas Chromatography/Mass Spectroscopy (GC-MS) analysis after the sodium carbonate treatment but prior to contact with the catalyst. The $CHCl_3$-enriched $H_2$ stream was passed through the fixed bed catalyst at different velocities in four separate runs and the effluent was analyzed by GC-MS, using a HP-6890 Series Gas Chromatograph and a HP-5973 Mass Selective Detector (Hewlett Packard) operating under the following parameters:

| Column: | CP-PoraBOND-Q 25 m X 320 µm X 5 µm |
|---|---|
| Injection: | Manual injection with 0.5 mL gas tight syringe; Split port 250° C., split ratio: 10:1 |
| Inlet Pressure: | 11.49 psi Helium |
| Flow: | 2.5 mL/min; Constant flow mode |
| Oven Ramp: | 20° C./min; Initial temperature: 150° C.; Final temperature: 250° C. |
| Detection: | MS detector; SIM ion mass 35 m/s, 47 m/s, 83 m/s and 85 m/s |
| Reference: | Chloroform |

The space velocity, $CHCl_3$ inlet concentration and $CHCl_3$ outlet concentration are listed in Table 4.

TABLE 4

| Test | Space Velocity (SCFH/ft³ catalyst) | Inlet $CHCl_3$ concentration (ppm) | Outlet $CHCl_3$ concentration (ppm) |
|---|---|---|---|
| 1 | 3,000 | 80,000 | 11 |
| 2 | 3,300 | 1,500 | 4.5 |
| 3 | 7,000 | 1,500 | 2 |
| 4 | 10,000 | 1,500 | 1.6 |

After the data in Table 4 was collected, the operating temperature was reduced to 400° F. (204° C.), at which point very little conversion was observed, i.e., the catalyst was deactivated. Deactivation was due to the nickel chloride forming on the catalyst at reduced temperature. The catalyst thus became inactive for converting organic chlorides to HCl. The catalyst can be reactivated by increasing the temperature to release chloride from the Ni.

The effluent in Test 1 was analyzed for other organic chlorides. Analysis for Test 1 is summarized in Table 5.

TABLE 5

| Compound | Test 1 Inlet Concentration (ppm) | Test 1 Outlet Concentration (ppm) |
|---|---|---|
| Chloroform | 80,000 | 11 |
| Dichloromethane | | 50–100 |
| Dichloroethane | | ~10 |
| Dichloroethylene | | ~10 |
| Trichloroethylene | | ~10 |
| Benzene* | Not analyzed | ~10 |
| Toluene* | Not analyzed | ~10 |
| Xylene* | Not analyzed | ~10 |
| Ethylbenzene* | Not analyzed | ~10 |

* Benzene, toluene, xylene and ethylbenzene were found in the effluent and are believed to be impurities in the feed stream.

As noted above, only a reference sample for chloroform was run. However, it is believed that the other peaks are indicative of the compounds identified in Table 5. The analysis of all peaks, except chloroform, is not quantitative because only the chloroform reference sample was run. However, the concentration of other compounds was roughly estimated by comparing the relative size of the peaks to the chloroform peak.

In Test 1, the chloroform content was reduced from 80,000 ppm (8%) to 11 ppm, representing a conversion of 99.99%.

The results in Table 4 demonstrate the effectiveness of the Ni catalyst to convert organic chloride to HCl. The results in Table 5 show that a substantial portion of the chloroform was dehalogenated.

Example 2

Field Testing of the Catalyst

Figure 3:
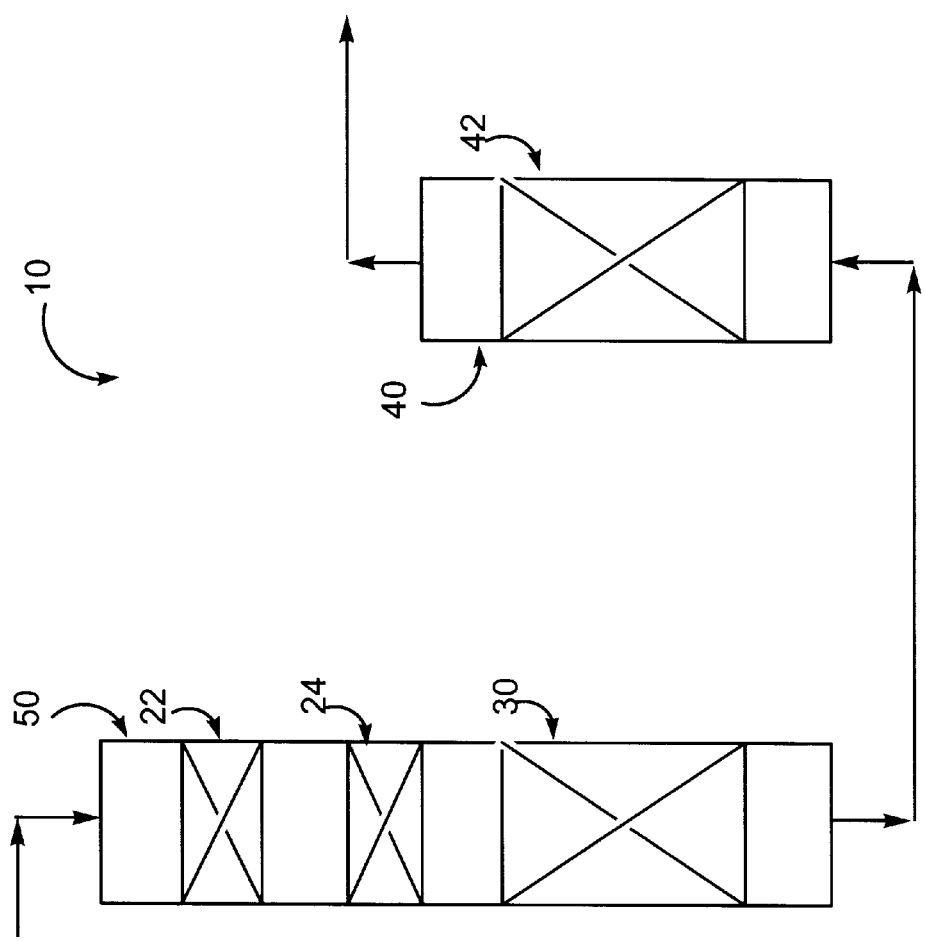
FIG. 3 is a schematic drawing of the reactor used in Example 2.

The reactor used in this example is depicted in FIG. 3. The fixed bed reactor 50, 6 inches (15 cm) inside diameter and 3 feet (0.9 m) long, was heated with an electric heater to a temperature in the range of 600–700° F. (316–371° C.).

The components used in the fixed bed reactor 50 were a HCl guard bed 22, a S guard bed 24 and a hydrogenation catalyst bed 30.

The HCl guard bed 22 was 9 inches (23 cm) long. The HCl guard bed 22 was made using promoted activated alumina, commercially available from Haldor Topsoe A/S under the trademark HTG-1.

After passing through the HCL guard bed 22, the gas stream passed through the S-guard bed 24. The S-guard bed was 9 inches (23 cm) long and was made from promoted zinc oxide, obtained from Haldor Topsoe A/S, under the trademark HTZ-4.

Finally, the gas contacted the hydrogenation catalyst bed 30 (HCL-10). The hydrogenation catalyst bed 30 was 18 inches (46 cm) long. Gas exiting the reactor 50 was passed through a post-treatment module 40 comprising a second HCl guard bed 42.

Gaseous $H_2$ at ambient temperature was preheated in metal tubing wrapped around the reactor 50 and fed into the reactor at 400 psig (2.8 MPa), at a flow rate of 500–1000 SCFH (14–28 Nm³/hr).

The components of the $H_2$ gaseous feedstock are listed in Table 6.

TABLE 6

| Component | Concentration (ppm) | Comments |
| --- | --- | --- |
| $O_2$ | 2000–6500 | Most samples were in the 5000–6000 ppm range, based on on-line analyzer |
| RCl | | A few samples had Total |
| Total as Cl | 1.5–3 | RCl (as Cl) concentrations |
| Chloroform | 1.2 | as high as 7.5 to 11.5 ppm. |
| $CH_2Cl_2$ | 0.2 | |
| $CCl_4$ | 0.1 | |
| Others | ND* | |
| CO | <1 | Up to 6 ppm in a few samples |
| $CO_2$ | <2 | Up to 7 ppm in a few samples |
| $CH_4$ | 5–10 | |
| $N_2$ | 200–300 | Large variation, up to 30,000 ppm. Air contamination of samples suspected. |

*Not Detectable

The components of the reactor effluent are listed in Table 7.

TABLE 7

| Component | Concentration (ppm) | Comments |
| --- | --- | --- |
| $O_2$ | ND* | Based on on-line analyzer |
| RCl | ND* | Detection limit is 0.05 ppm |
| CO | ND* | Detection limit is 0.2 ppm |
| $CO_2$ | 0–1.4 | Detection limit is 0.2 ppm |
| $CH_4$ | 8–15 | $CH_4$ balance often did not close |
| $N_2$ | 200–300 | Wide range noted in many samples. Air contamination suspected. |
| $H_2S/COS$ | ND* | |
| $NH_3$ | 11–15 | Detected by FTIR analyzer |
| HCl | ND* | HCl may be neutralized with $NH_3$ in the reaction HCl + $NH_3 \rightarrow NH_4Cl$. |

Table 7 shows that $O_2$, RCl, CO and $CO_2$ were removed to levels below the analyzer detection limit. There was no change in the performance of the unit over a period of six weeks, the period of the testing.

After the test was completed, the hydrogenation catalyst was removed and analyzed for build-up of chlorides, sulfur and carbon on the catalyst. No evidence of build-up was found. The catalyst was found in "as new" condition.

This demonstrated that a reasonably long catalyst life can be expected, while accomplishing a substantially complete impurity removal.

Preferred processes for practicing the invention have been described. It will be understood that the foregoing is illustrative only and that other embodiments of the process can be employed without departing from the true scope of the invention defined in the following claims.

We claim:

1. A process for treating a gas stream having at least about 90 volume percent of $H_2$, based on the total volume or all constituents comprising said gas stream, at least one halogen-containing compound and a total concentration of S-containing compounds less than about 2 ppm by volume, based on a mono-sulfur compound equivalent, said process comprising:

(a) contacting said gas stream with a nickel catalyst composition at a temperature in a range from about 475° F. to about 850° F. (from about 2460° C. to about 454° C.), wherein said halogen-containing compound contacts said nickel catalyst composition so that a substantial portion of said halogen containing compound is reduced, said catalyst composition comprising a source for nickel in a zero oxidation state, $Ni^0$, selected from the group consisting of (i) at least about 5 weight percent $Ni^0$, (ii) a $Ni^0$ precursor having $Ni^{+n}$, where $1 \leq n \leq 4$, that can produce at least about 5 weight percent $Ni^0$ under substantially reducing conditions, and (iii) combinations thereof, said $Ni^0$ weight percent being measured as a percentage of the total weight of all constituents comprising said nickel catalyst composition; and (b) producing a nickel catalyst-treated gas stream, wherein substantially all halogen-containing compounds are de-halogenated.

2. The process of claim 1, wherein the gas stream further comprises $O_2$.

3. The process of claim 2, wherein the mole ratio of $H_2$ to $O_2$ in said gas stream is at least about 10 to 1.

4. The process of claim 2, wherein the mole ratio of $H_2$ to $O_2$ in said gas stream is in a range of from about 10 to 1 to about 100,000 to 1.

5. The process of claim 2, wherein at least a portion of said halogen-containing compounds and at least a portion of said $O_2$ are reduced substantially concurrently.

6. The process of claim 1, wherein the total concentration of S-containing compounds is less than about 1 ppm by volume, based on a mono-sulfur compound equivalent.

7. The process of claim 1, further comprising pre-treating said gas stream by contacting said gas stream with a pre-treatment material comprising zinc oxide so that at least a portion of any sulfur-containing compounds in said gas stream is removed.

8. The process of claim 7, further comprising, prior to the pre-treating step, removing at least a portion of zinc oxide poisons present in said gas stream by contacting said gas stream with an adsorbent bed.

9. The process of claim 8, wherein said zinc oxide poisons are selected from the group consisting of HCl, HF, HBr, HI and combinations thereof.

10. The process of claim 1, wherein said gas stream is contacted with said catalyst composition at a temperature in a range of from about 600° F. to about 850° F. (from about 316° C. to about 454° C.).

11. The process of claim 1, wherein the nickel catalyst-treated gas stream is substantially free of halogen-containing compounds and comprises $H_2O$, a halogen-containing acid and a saturated hydrocarbon having from 1 to about 3 carbon atoms.

12. The process of claim 11, further comprising removing said halogen-containing acid by contacting said nickel catalyst-treated gas stream with a pre-treatment bed selected from the group consisting of an adsorbent bed, a chemical neutralizing bed, and combinations thereof.

13. The process of claim 12, wherein the adsorbent bed comprises a material selected from the group consisting of alumina, calcium oxide, and combinations thereof.

14. The process of claim 1, wherein said gas stream further comprises oxygen-containing compounds.

15. The process of claim 14, wherein said oxygen-containing compounds are selected from the group consisting of CO, $CO_2$, $O_2$, $N_2O$, NO, $NO_2$, $HNO_3$ and combinations thereof and $CH_4$, $H_2O$, $NH_3$ and combinations thereof are produced from said nickel catalyst-treatment.

16. The process of claim 1, wherein said gas stream further comprises amines.

17. The process of claim 16, wherein said amines are selected from the group consisting of $R_1NH_2$, $R_1R_2NH$, $R_1R_2R_3N$, and combinations thereof and $NH_3$ is produced when said gas stream is contacted with said nickel catalyst composition, where $R_1$, $R_2$ and $R_3$ are independently selected from the group consisting of $C_1$ to $C_3$ hydrocarbyl groups.

18. The process of claim 1, wherein said nickel catalyst composition comprises said nickel source and a support for said nickel source.

19. The process of claim 18, wherein said support is inert with respect to hydrodehalogenation and halo-compound by-product reactions.

20. The process of claim 18, wherein said support is selected from the group consisting of aluminum oxide, magnesium oxide, calcium oxide and combinations thereof.

21. The process of claim 20, wherein the concentration of said support is in a range of from about 35 to about 95 wt. % in said nickel catalyst composition.

22. The process of claim 1, wherein the concentration of $H_2$ in said gas stream is at least about 95 volume percent.

23. The process of claim 1, wherein the concentration of $Ni^0$ or $Ni^0$ precursor is in a range of from about 5 to about 65 weight percent.

24. The process of claim 1, wherein the concentration of $Ni^0$ or $Ni^0$ precursor is in a range of from about 10 to about 50 weight percent.

25. The process of claim 1, wherein the concentration of $Ni^0$ or $Ni^0$ precursor is in a range of from about 15 to about 25 weight percent.

26. The process of claim 1, wherein said nickel catalyst composition further comprises a promoter in a concentration of from about 0.1 to about 5 weight percent.

* * * * *

UNITED STATES PATENT AND TRADEMARK OFFICE
CERTIFICATE OF CORRECTION

PATENT NO.    : 6,551,566 B1                                           Page 1 of 1
DATED         : April 23, 2003
INVENTOR(S)   : Bhadra S. Grover and Henrik Rasmussen It is certified that error appears in the above-identified patent and that said Letters Patent is hereby corrected as shown below:

<u>Column 14,</u>
Line 3, please delete "2460º C" and insert -- 246º C --.

Signed and Sealed this

Seventh Day of October, 2003

JAMES E. ROGAN
*Director of the United States Patent and Trademark Office*